Sept. 26, 1967     L. J. RAPP     3,343,876
VEHICLE BOX UNLOADER
Filed Aug. 27, 1965     2 Sheets-Sheet 1
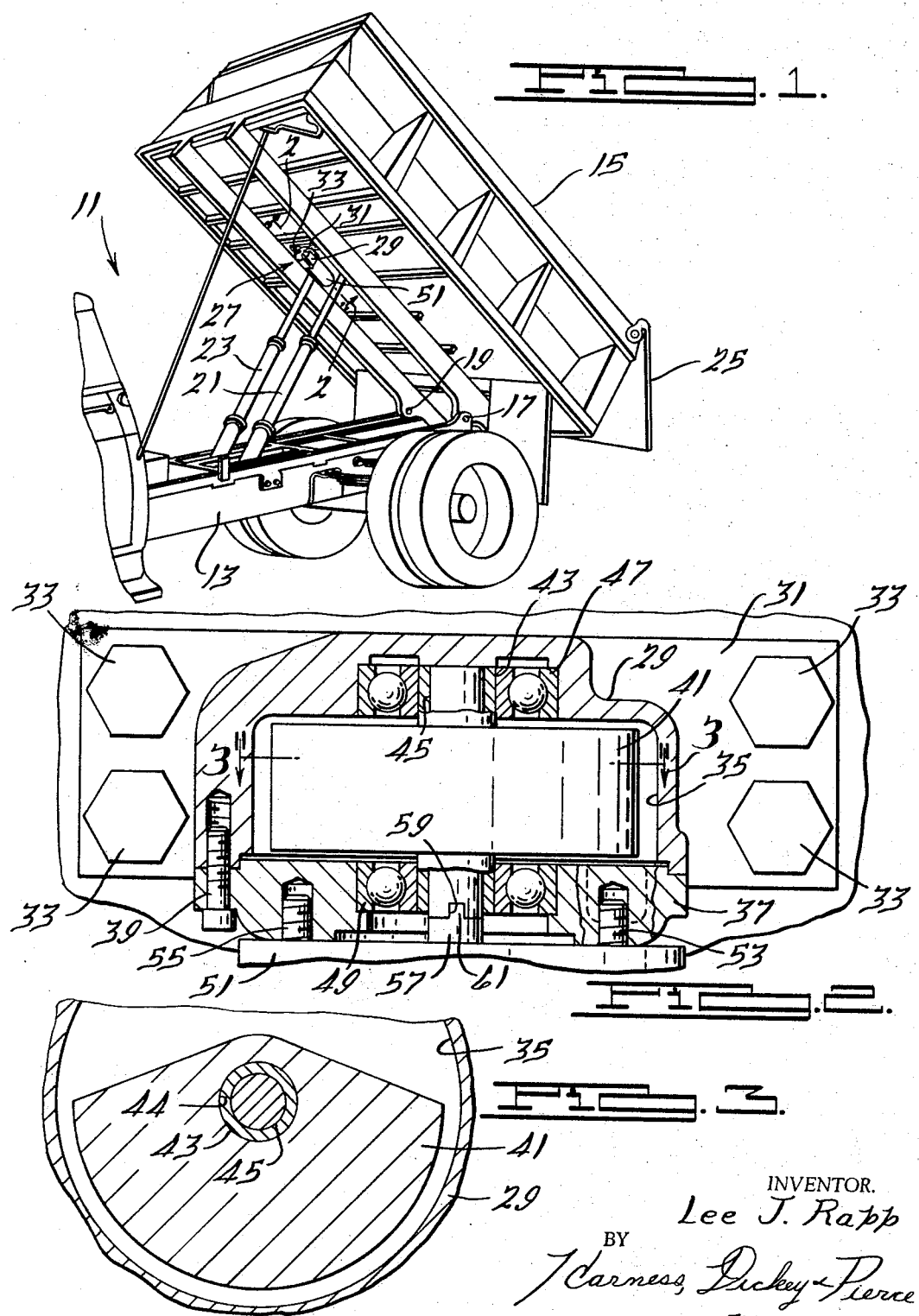
INVENTOR.
Lee J. Rapp
BY
Carness, Dickey & Pierce
ATTORNEYS.

Sept. 26, 1967     L. J. RAPP     3,343,876
VEHICLE BOX UNLOADER
Filed Aug. 27, 1965     2 Sheets-Sheet 2
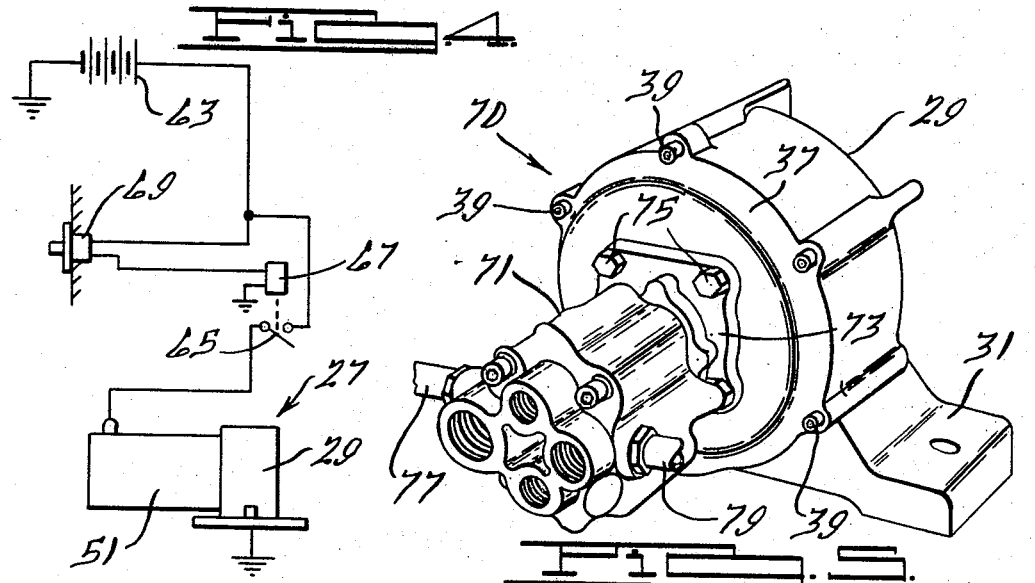
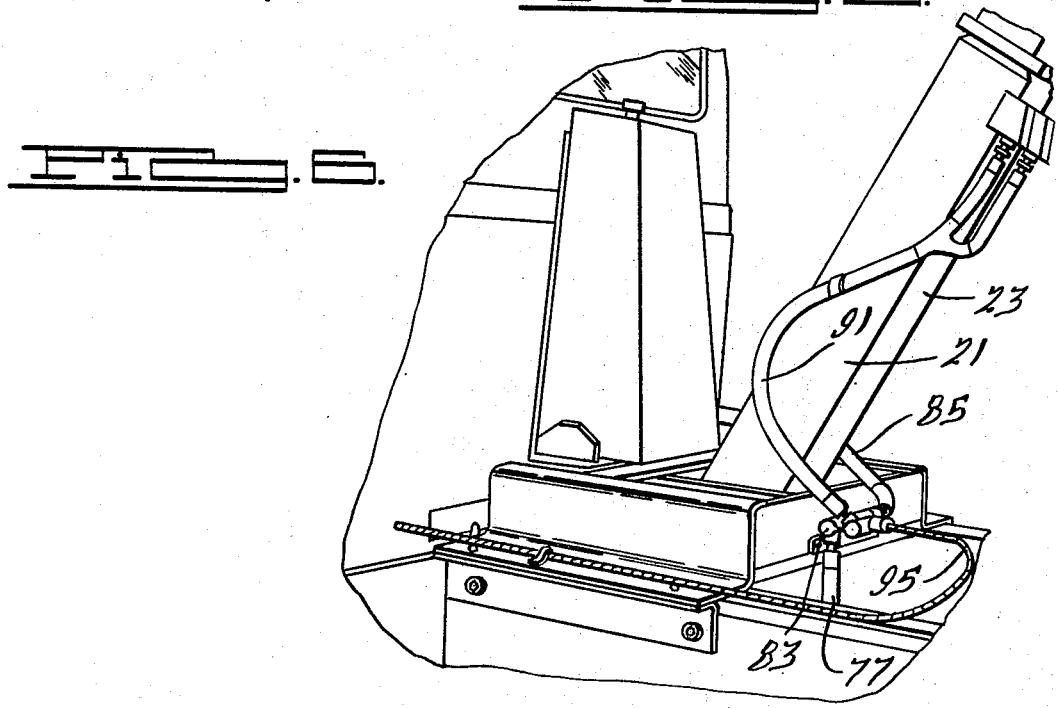
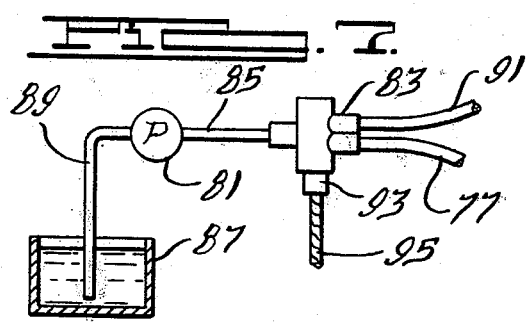
INVENTOR.
*Lee J. Rapp*
BY
*Harness, Dickey & Pierce*
ATTORNEYS United States Patent Office 3,343,876
Patented Sept. 26, 1967

3,343,876
VEHICLE BOX UNLOADER
Lee J. Rapp, La Moille, Ill., assignor to Tek-O-Motive,
Incorporated, Princeton, Ill., a corporation of Illinois
Filed Aug. 27, 1965, Ser. No. 483,155
4 Claims. (Cl. 298—1)

This invention relates generally to material moving, and particularly to an improved vehicle box unloading assembly.

In unloading materials from a vehicle box, such as, for example, a truck box on a dump truck, it is important for efficient operation and results that all of the materials be removed from the box. Often, some of these materials stick to the box surfaces or become lodged in its corners and either the truck driver or a helper must climb into the box and loosen the materials by hand to effect complete removal.

A related and more serious problem can arise when the materials block the unloading opening in the box, such as, for example, when the materials freeze and/or stick together causing them to "bridge" the unloading opening. Here, again, the truck driver or his helper must climb into the truck box and manually dislodge the materials from the box opening. Both this and the step of dislodging small amounts of the materials from the box surfaces and/or corners result in lost production time but, more importantly, can result in serious injury to the driver, his helper or to others. Thus, one can slip while climbing into the truck box or the truck can lurch suddenly, or, if the box opening is blocked, the materials might suddenly become free and unload onto someone standing nearby. More importantly, if the driver has no helper and must dislodge these materials himself, he necessarily must leave the truck controls unattended. This is an extremely dangerous situation and can result in very serious injury to persons and/or property. Therefore, a strong need exists for a device capable of insuring complete unloading of materials from a vehicle box and which does not require manual assistance at the box and enables the vehicle driver or operator to remain at the vehicle controls.

Main objects of the present invention are a vehicle box unloader adapted to insure complete removal of materials from the box during unloading, which requires no manual unloading assistance and which enables the vehicle operator to remain at the vehicle controls.

Further objects include a vehicle box unloader adapted to free materials which may stick to the box surfaces or in its corners, to free materials which may bridge or block the box unloading opening and which is easily controlled from within the vehicle.

Additional objects include a vehicle box unloader of the above character which is relatively inexpensive to manufacture, rugged in construction and reliable in use.

Other objects and advantages of the present invention will become more apparent from a consideration of the following detailed description taken in conjunction with the drawings in which:

FIGURE 1 is a perspective view of a portion of a dump truck embodying one form of the present invention;

FIG. 2 is an enlarged sectional view of the structure of FIG. 1 taken along the line 2—2 thereof;

FIG. 3 is a sectional view of the structure of FIG. 2 taken along the line 3—3 thereof;

FIG. 4 is a schematic illustration of a control circuit for the form of the invention illustrated in FIGS. 1–3;

FIG. 5 is a perspective view of a modified form of the present invention;

FIG. 6 is a fragmentary perspective view of a truck embodying the form of the invention illustrated in FIG. 5 and shows a control valve therefor; and FIG. 7 is a fragmentary schematic illustration of a control circuit for the form of the invention shown in FIGS. 5 and 6.

Broadly described, the present invention includes a vibrator adapted to be secured to a vehicle box having an unloading opening and to be energized during unloading of the box whereby to vibrate the box and insure complete removal of all the materials therein.

Referring now more specifically to the drawings, and particularly FIG. 1, a truck embodying the present invention is generally indicated at 11 and is seen to include a chassis 13 on which a truck box 15 is pivotally mounted through pivot means 17, 19. The box 15 is controllably raised and lowered on the chassis 13 by suitable means, such as, for example, hydraulic lift cylinders 21, 23 which form a part of a standard truck box hydraulic lift system.

The box 15 has a gate 25 at its rearward end adapted to swing outwardly away from the box when it is in the raised or "dump" position as shown in FIG. 1. Theoretically, this permits the materials within the box 15 to fall by gravity past the gate 25 into a suitable receptacle or onto the ground.

In practice, the materials within the box 15 have a tendency to stick to the box surfaces and to lodge in the corners thereof. In addition, the materials sometimes "bridge" or block the opening adjacent the gate 25. In either case, complete removal of all the materials within the box 15 is not effected simply by raising the box upon the pivots 17, 19 by the lift cylinders 21, 23 and it is generally required that either the driver or a helper climb into the box 15 and dislodge the materials by hand. This practice is not only time-consuming and a waste of manpower but it also can be exceedingly dangerous. Thus, one can easily slip while on or in the box 15, the truck can move or lodged materials suddenly become free, any one of which can cause injury. In addition, if the vehicle operator has no helper and is required to free the materials within the box 15 himself, he must leave the vehicle unattended during this time, which, as described above, is a very undesirable condition.

The present invention contemplates complete and automatic removal of all the materials from the box 15 while the operator remains in the truck where he is not only safe from injury but also where he can maintain full control of the vehicle. Thus, a vibrating device shown generally at 27 in FIG. 1 is seen to be secured directly to the box 15 at some convenient location. As shown in FIG. 1, the vibrating device 27 is fixed to the underside of the box 15 although it is to be understood that it might be desirable in some installations to mount it along one of the sides of the box 15 or at some other location.

The vibrating device 27 includes a housing 29 having an integral flanged base 31 adapted to be secured to the box 15 by bolt means 33 (FIGS. 2 and 3). The housing 29 has a cavity 35 therein opening to one end thereof and closed by a cover plate 37 secured to the housing by screws 39. An unbalanced weight 41 is rotatably disposed within the cavity 35 and has a bronze sleeve 43 pressed into an opening 44 therethrough for rotation therewith. A shaft 45 extends nonrotatably through the sleeve 43 and the sleeve and shaft together are supported in ball bearings 47, 49 in the housing 29 and the cover plate 37, respectively.

An electric drive motor 51 adapted to rotate the unbalanced weight 41 is removably secured to the housing cover plate 37 by screws 53, 55. This drive motor 51 may be a conventional 6, 12 or 24 volt vehicle electric starter motor and as such is conventionally equipped with the mounting screws 53, 55 and has an output shaft 57 formed with a grooved end 59 receiving a complementary shaped tongue 61 formed on the end of the shaft 45.

In use, the drive motor 51 is energized when it is desired to insure complete removal of the materials in the truck box 15 or to free the materials from the opening adjacent the gate 25. This causes the output shaft 57 to rotate through the tongue 61 and groove 59 connection and rotates the shaft 45. The weight 41 rotates conjointly with the shaft 45 and by virtue of its unbalanced configuration develops radial inertia forces which are a function of the mass of the weight 41 and its speed of rotation. These forces are transmitted to the housing 29 through the bearings 47, 49 and therefore to the truck box 15 causing it to vibrate and thereby freeing any materials therein which might be bridging or blocking the opening adjacent the gate 25 or which may be lodged in the corners of the box 15 or stuck to the surfaces thereof. The tongue 61 and groove 59 connection between the shafts 45, 57 permit limited relative lateral movement between these shafts and keep them from binding as a result of the forces developed by the vibrations during use. In actual practice, starter motors have been found capable of developing up to 8000 vibrations per minute and are effectively used to assist and insure complete removal of materials from truck boxes having capacities of up to 10 tons.

FIG. 4 illustrates a schematic control circuit for the vibrating device 27. As shown there, a conventional D.C. battery power source 63 for the vehicle 11 is connected to the vibrator electric starter motor 51 through a normally open, heavy-duty switch 65 and to a solenoid 67 through a normally open switch 69. The solenoid 67 is adapted when energized by closing the switch 69 to close the heavy-duty switch 65 and energize the starter motor 51. Thus, so long as the switch 69 is closed, the vibrating device 27 continues to operate. Conveniently, the switch 69 is mounted within the cab of the vehicle 11, preferably on the dash so that the vehicle driver easily controls vibration of the box 15 without having to leave the cab. This provides a considerable time and manpower savings and allows the driver to maintain complete control over the vehicle.

A modified form of the present invention is illustrated in FIGS. 5–7. In this form, the vibrating device, illustrated generally at 70, utilizes a hydraulic drive motor 71 instead of the electric drive motor 51. In addition, the drive motor 71 may conveniently be powered by the same source as used to power the hydraulic lift system for the truck box 15. The hydraulic motor 71 has a flanged plate 73 removably secured to the housing cover plate 37 by screws 75 and has a rotary output shaft (not shown) similar to the output shaft 57 of the electric motor 51. The vibrator structure within the housing 29 along with the interconnection between the motor and unbalanced weight shafts in this embodiment is substantially identical to that described above for FIGS. 1–3 and a detailed description thereof is omitted here.

The hydraulic motor 71 may be any conventional rotary type powered by pressure fluid supplied from an inlet conduit 77 and exhausted through an outlet conduit 79. The inlet conduit 77 is connected to a hydraulic pump 81 through a three-way valve 83 and a conduit 85, which pump may also power the lift cylinders 21, 23 for the truck box 15 as described above. The pump 81 may be located either under the truck hood or at the rear of the cab and is connected to a fluid reservoir 87, illustrated diagrammatically in FIG. 7, by a conduit 89 as is the exhaust conduit 79 from the motor 71. The valve 83 preferably is located near the pump 81 and also connects the pump 81 to the lift cylinders 21, 23 through a conduit 91.

In use, the valve 83 normally is positioned to direct fluid from the reservoir 87 to the lift cylinders 21, 23 to raise and lower the truck box 15. When it is desired to vibrate the box 15 to insure complete removal of the materials therefrom, the flow of fluid from the reservoir 87 is directed through the valve to the motor 71. To this end, the valve 83 has a control knob 93 to which one end of a Bowden cable 95 is fixed. The control knob 93 is normally biased in one direction causing flow therethrough to the lift cylinders 21, 23 but is movable in the opposite direction upon movement of the cable 95. Conveniently, the cable 95 extends through the cab of the truck 11 and the other end thereof is fixed to a knob (not shown) on the dash. Thus, when it is desired to energize the vibrating device 70, the vehicle driver pulls the Bowden cable 95. This moves the valve control knob 93 which blocks the flow of fluid to or from the lift cylinders 21, 23 thereby locking the box 15 in its raised or "dump" position and causes fluid to flow through the conduit 77 to the vibrator motor 71 under the action of the pump 81. The motor 71 is then energized and its output shaft drivingly rotates the shaft 45 thereby rotating the weight 41 and causing the truck box 15 to vibrate. In practice, hydraulic motors having a displacement of up to 26 gallons per minute and capable of inflicting up to 15,000 vibrations per minute have been successfully used to completely remove all difficult materials from truck boxes having capacities up to maximum allowable highway weight.

While the above embodiments have been illustrated particularly as mounted on truck boxes of the dumping type, it will be appreciated that it serves equally as well in assisting complete removal of materials from non-dumping truck boxes.

By the present invention, there has been provided a highly efficient and effective vehicle box unloading assembly calculated to fulfill the objects set forth above and although preferred embodiments have been illustrated and described in detail above, various additions, substitutions, modifications and omissions may be made thereto without departing from the spirit of the invention as encompassed by the appended claims.

What is claimed is:

1. A vibrating device for a truck box having an unloading opening therein, said device including a closed housing having an integrally formed base adapted to be secured to said box, said housing having a cavity positioned therein, vibrating means mounted within said cavity in said housing and including an unbalanced weight secured to a shaft rotatably supported in said housing, said shaft having one end extending through said housing and a drive motor mounted on said housing having a rotary output shaft drivingly engaging said first-mentioned end of said shaft, said driving engagement between said shafts being effected by a tongue and groove arrangement adapted to permit limited lateral relative movement between said shafts.

2. In combination, a truck having a materials box, a vibrating device for said box, said vibrating device including a closed housing having an integrally formed flanged base with a flat surface secured to said box, said housing having a cavity positioned therein, vibrating means mounted on a shaft within said cavity in said housing, said shaft having an end extending through said housing and a drive motor mounted on said housing and having a rotary output shaft drivingly engaging said end of said first-mentioned shaft, said driving engagement between said shafts being effected by a tongue and groove arrangement adapted to permit limited lateral movement between said shafts.

3. In a vibrating device for a box-like structure, a housing having a cylindrical cavity, a cover plate removably secured to said housing, a bearing in said housing on the centerline of the cavity, a bearing in the cover plate having a center aligned with that of said bearing in said housing, a shaft supported by said bearings, an offcenter weight supported by said shaft within said cavity, a second shaft in axial alignment with said first shaft having a tongue and groove drive engagement with one end of said first shaft such as to permit offcenter motion therebetween, and motor means for driving said second shaft.

4. In a vibrating device as recited in claim 3, wherein said shaft has a steel center and a sleeve of nonferrous material thereabout which frictionally engages said weight.

References Cited
UNITED STATES PATENTS

| | | | |
|---|---|---|---|
| 1,684,095 | 9/1928 | Heaton | 298—1 |
| 2,060,130 | 11/1936 | Scott. | |
| 2,222,422 | 11/1940 | Nelson | 74—87 X |
| 2,278,839 | 4/1942 | Douglass | 259—1 |
| 2,523,212 | 9/1950 | Hight | 214—83.3 |
| 2,664,002 | 12/1953 | Anderson | 287—103 X |
| 3,272,024 | 9/1966 | Wahl | 74—87 |

FOREIGN PATENTS

| | | |
|---|---|---|
| 928,660 | 6/1963 | Great Britain. |

OTHER REFERENCES

Vibrolator Vibrators, pages 16 and 18, published by Martin Engineering Co., Neponset, Ill. Copyright 1959, 1966.

BENJAMIN HERSH, *Primary Examiner.*

RICHARD J. JOHNSON, *Assistant Examiner.*